United States Patent [19]

Enein

[11] 4,318,104

[45] Mar. 2, 1982

[54] DIRECTIONAL ARRAYS

[75] Inventor: Mohamed H. Enein, Woking, England

[73] Assignee: Plessey Handel und Investments AG, Zug, Switzerland

[21] Appl. No.: 48,379

[22] Filed: Jun. 14, 1979

[30] Foreign Application Priority Data

Jun. 15, 1978 [GB] United Kingdom ............... 26990/78
Jun. 22, 1978 [GB] United Kingdom ............... 27647/78
Jul. 14, 1978 [GB] United Kingdom ............... 29946/78

[51] Int. Cl.³ .......................... H04B 7/00; H01Q 3/26

[52] U.S. Cl. ....................... 343/100 LE; 343/100 SA; 343/854

[58] Field of Search .................. 343/100 SA, 100 LE, 343/854

[56] References Cited

U.S. PATENT DOCUMENTS

| | | | |
|---|---|---|---|
| 3,530,485 | 9/1970 | Radford | 343/854 |
| 3,594,811 | 7/1971 | Pierrot | 343/100 LE |
| 3,707,719 | 12/1972 | Mark | 343/100 SA |
| 3,710,281 | 1/1973 | Thomas | 343/854 |
| 3,713,158 | 1/1973 | Burnham | 343/100 SA |
| 3,731,316 | 5/1973 | Sheleg | 343/854 |
| 4,041,501 | 8/1977 | Frazita et al. | 343/100 SA |
| 4,045,800 | 8/1977 | Tang et al. | 343/854 |
| 4,052,723 | 10/1977 | Miller | 343/100 SA |
| 4,080,605 | 3/1978 | Hilton | 343/854 |

FOREIGN PATENT DOCUMENTS

| | | |
|---|---|---|
| 2210841 | 7/1974 | France . |
| 1454554 | 11/1976 | United Kingdom . |

OTHER PUBLICATIONS

Introduction to Radar Systems; Skolnik; Sec. 7.7, pp. 298-299.

Bandwidth of Phased Arrays; Radar Handbook; Merrill & Skolnik; pp. 11.45-11.46.

Subarray Analysis; R. E. Willey; Sep. 30, 1960; pp. 1-10, 32-42.

Phased Array Antennas; Tang; Jun. 1970; pp. 255-260.

Phased Arrays for Radars; Cheston; Nov. 1968; pp. 102-111.

*Primary Examiner*—S. C. Buczinski
*Attorney, Agent, or Firm*—Fleit & Jacobson

[57] ABSTRACT

A beam steering or scanning system comprising a plurality of groups of radiating elements each group of which is connected to a controllable array signal distribution means which is itself a plurality of phase shifters and/or timing delays or sequences appropriately weighted hereinafter referred to as the array beam former the spacial directional beams being generated and scanned by controlling the array beam former while contemporaneously controlling a sub-array beam forming system forming part of the beam steering system so as to modify the sub-array factors as well as the array factor whereby a resultant beam configuration is produced in which grating lobes are obviated or at least significantly suppressed.

11 Claims, 5 Drawing Figures a) RADIATION PATTERNS OF SUBARRAY AND THE MAIN ARRAY b) PRODUCT OF ARRAY FACTOR AND SUBARRAY PATTERN

PHASED ARRAY USING SUBARRAYS WITH DIGITAL PHASE SHIFTERS

1° BW I40° COVERAGE a) EIGHT ELEMENTS, EIGHT BEAMS BUTLER MATRIX b) BLASS MATRIX

DIRECTIONAL ARRAYS

Figure 1A:
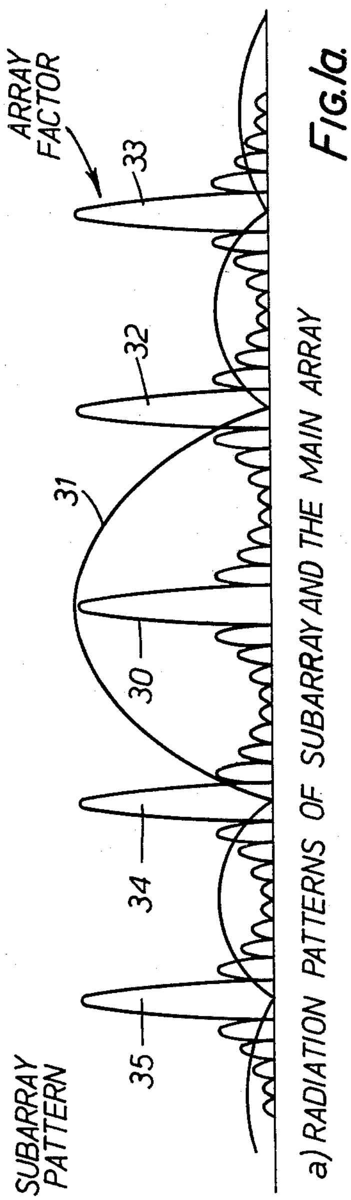

This invention relates to scanned directional arrays for electromagnetic, acoustic or mechanical radiation or reception of energy.

Directional characteristics (e.g. beam forming) are achieved in such arrays by beam forming networks which are comprised of phase shift, time-delay or sequence components attached to the transmit or receive elements.

If in a known system a narrow scanning beam is to be generated by means of an array of elements attached to a beam forming system, then an array which may comprise many elements is normally required. The radiated array beam pattern (or directional characteristic) is determined by the number, shape and arrangement of the elements of the array. The achieved array beam shape is defined by the combination of the element (or sub-array) directional pattern, hereinafter known as the element (or sub-array) factor, and the pattern produced by the radiation or reception from any array of omnidirectional elements identically positioned at the element (or sub-array) positions, hereinafter known as the array factor. The element (or sub-array) factor achieves a directional characteristic either by virtue of the element shape or from a combination of elements connected to a beam forming network in a sub-group to form a sub-array. The sub-array factor directional characteristics are modified by changing the relative weighting, phase and/or timing of the elements of the sub-array signals by means of the sub-array beam forming network, or by adjustment of the element geometry. The array factor directional characteristics are modified by changing the weighting, phase and/or timing of the signals to or from the array by means of the array beam forming network. A well-known phenomenon associated with the wide spacing of elements in the array is the generation of 'grating lobes' which phenomenon is primarily attributed to the 'array factor' and is modified by the element (or sub-array) factor. A disadvantage of known array systems is that since a large number of closely spaced array elements are used to avoid the 'grating lobe' phenomena, a correspondingly large number of components are required in the beam forming system to modify either phase or timing of the element signals and this is undesirable both from a cost and complexity point of view.

According to the present invention a beam steering (or scanning) system comprises a plurality of groups of radiating elements, each group of which is connected to a controllable array signal distribution portion, which is itself a plurality of phase shifters and/or timing delays or sequences appropriately weighted, hereinafter referred to as the array beam-former. The spatial directional beams being are generated and scanned by controlling the array beam-former whilst contemporaneously controlling the sub-array beam forming system (including a sub-array controllable signal distribution means) so as to modify the sub-array factors as well as the array factor, whereby a resultant beam configuration is produced in which grating lobes are obviated or at least significantly suppressed.

The sub-array controllable signal distribution means may be a 'lens' such as the 'Rotman lens' as described in I.E.E.E. transactions Vol. AV-11 No. 6 November 1963 pp. 623–632 in an article entitled "Wide angle microwave lens for line source applications" by W. Rotman.

Alternatively the distribution means may be a physical network of components and connections normally referred to as a signal distribution matrix.

Thus in a system according to the present invention relatively few phase shifters and/or timing delays are required since one only per group of elements is necessary instead of one per element. In order to provide grating lobe suppression while scanning the directional beam, the sub-array beam pattern is scanned contemporaneously with the main array—one method of achieving this is, for example, be means of time blending.

Any arrangement of signal feed systems may be used, either a single signal generator feeding the elements over a distribution system, or a distributed set of signal generators.

Each signal distribution network may have output terminals connected one to each element of the group which it feeds and input terminals fed via switch means from its associated phase shifter so that the input terminals are fed sequentially from the phase shifter consequent upon operation of the switch means.

The sub-array network may control the sub-array directional pattern by a sequential switch procedure in the array distribution network.

The signal distribution matrices may be Butler matrices or alternatively they may be Blass matrices or other suitable distribution networks.

Figure 1B:
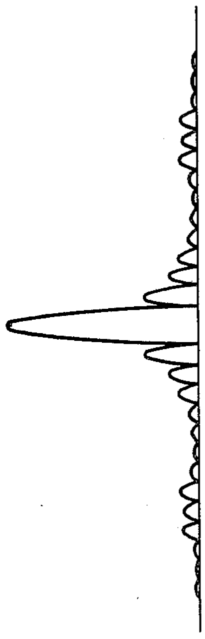
Figure 2:
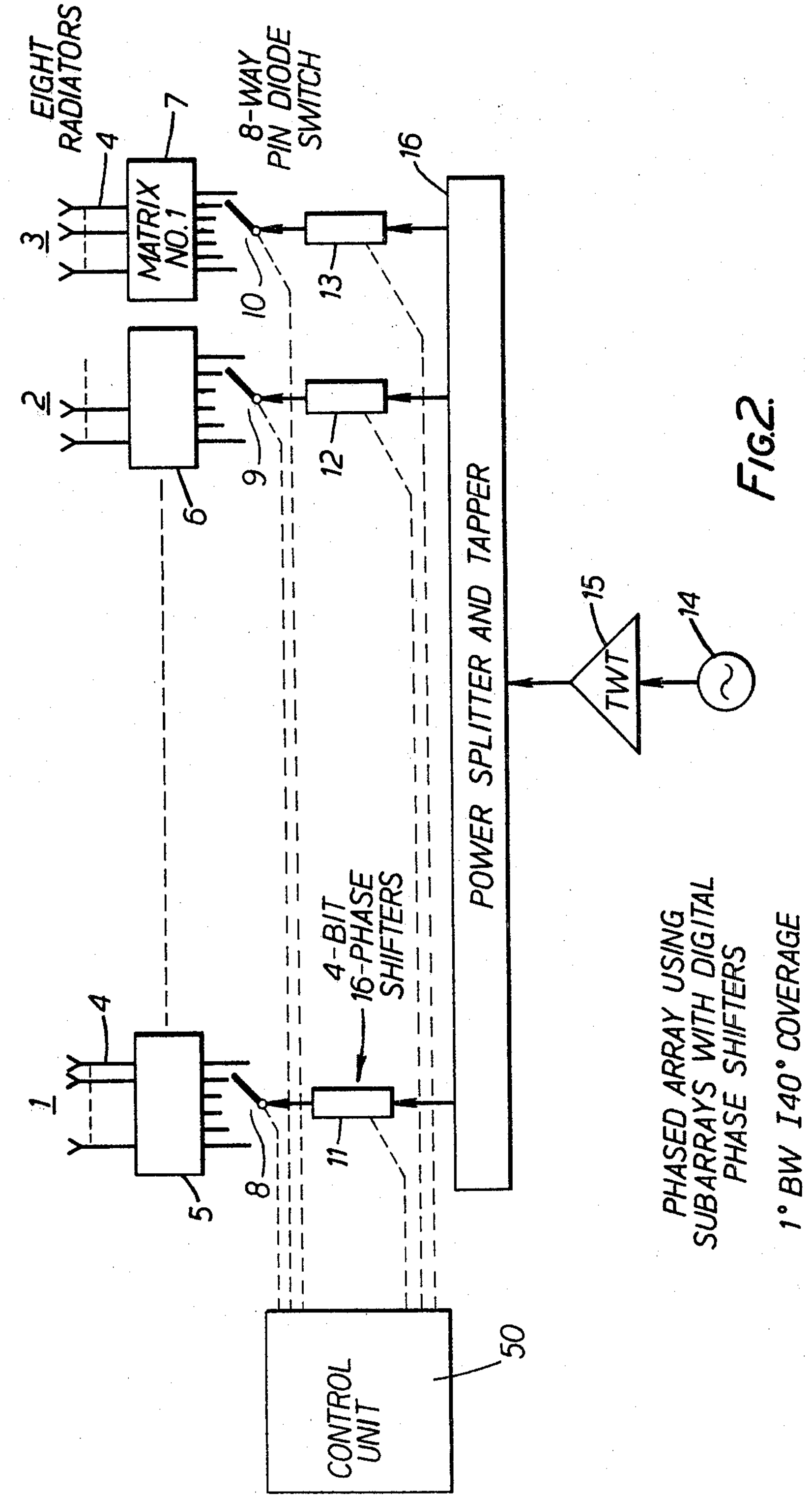
Figure 3A:
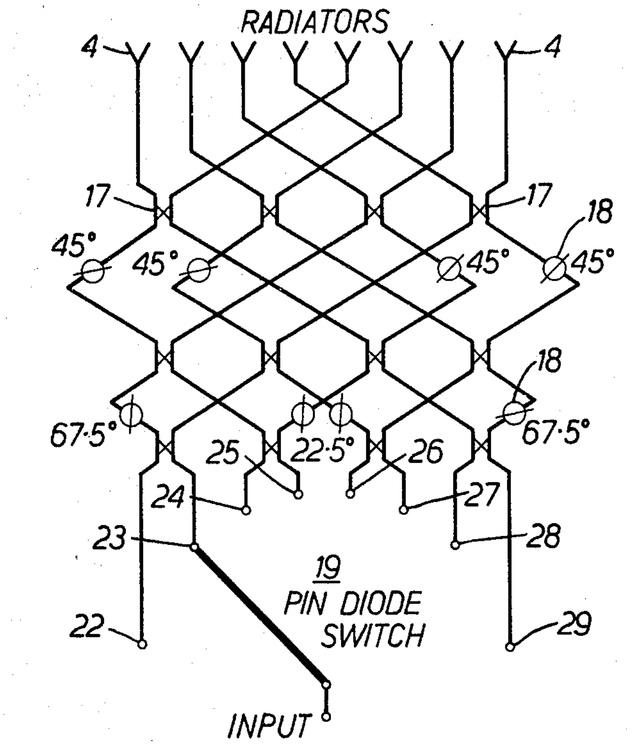
Figure 3B:
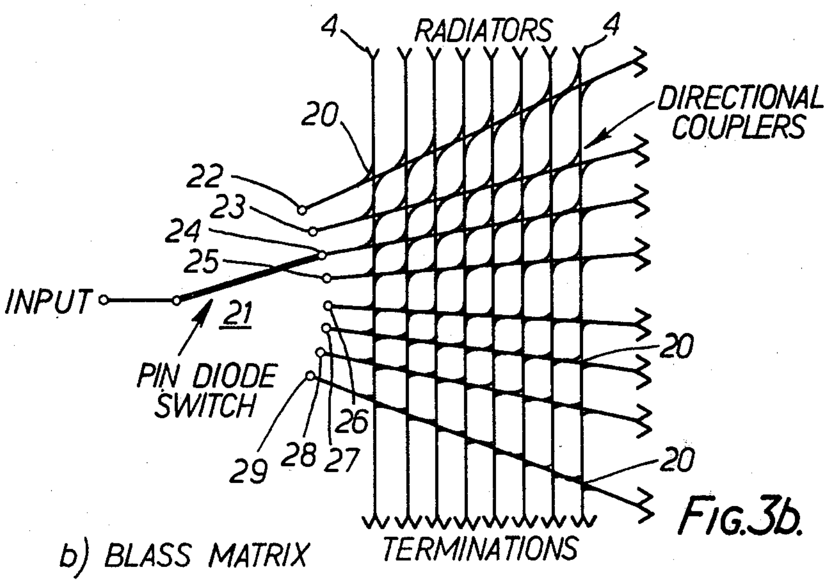

One embodiment of the invention will now be described by way of example with reference to the accompanying drawings in which:

FIG. 1*a* and FIG. 1*b* are waveform diagrams;

FIG. 2 is a generally schematic block diagram of a beam steering system according to the present invention;

FIG. 3*a* and FIG. 3*b* are generally schematic block diagrams of a Butler matrix arrangement and a Blass matrix arrangement respectively.

Referring now to FIG. 2 an aerial array comprises sixteen sub-arrays only three of which 1, 2 and 3 are shown each comprising a group of eight radiating elements 4. Each group of elements is fed via a signal distribution matrix 5, 6, 7 and pin diode switches 8, 9, 10 from a phase shifter 11, 12, 13. The phase shifters are fed from a signal generator 14 via a power amplifier 15 and a signal splitter 16. The matrices 5, 6 and 7 may be Butler matrices or Blass matrices as shown in FIGS. 3*a* and 3*b* respectively. Alternatively although not shown herein the matrices may be replaced by lenses such as the 'Rotman lens'. The Butler matrices each include couplers 17 and phase shifters 18 operatively associated with the elements 4 and a pin diode switch arrangement 19 as shown, whereas the Blass matrices each comprise a matrix of directional couplers 20 fed from a pin diode switch 21 and coupled to feed the radiating elements 4.

In operation of the system, the sixteen phase shifters, only three of which 11, 12, 13 are shown, are phase controlled (via a control input from control unit 50) to effect beam scanning and contemporaneously (by means of control unit 50) during each scan the sixteen switches such as switches 8, 9, 10 are swept between input terminals or ports 22 to 29 sequentially as shown in FIG. 3*a* and 3*b*, the switches themselves being operated sequentially. Thus at the start of each scan, switch 8 (i.e., pin diode switch 19 in the embodiment of FIG. 3*a*, or pin diode switch 21 in that of FIG. 3*b*) is operated so that it changes from port 22 to port 23. The other switches are then changed similarly and in sequence finishing with the switch 10. The switch 8 is then changed to port 24 and the other switches are again changed similarly and sequentially finishing with the switch 10. In this manner all switches are swept between ports 22 and 29 during each scan so that the 'element factor' is changed continuously with the 'array factor' to suppress grating lobes.

The manner in which the grating lobes are suppressed is best understood by making reference to FIG. 1*a* wherein a radiation pattern 30 due to the main array, which is steered by means of the phase shifters, is shown together with a radiation pattern 31 due to a sub-array which is steered by means of the switches. It can be seen that grating lobes represented by signal peaks 32 to 35 on the radiation pattern of the main array correspond with nulls in the radiation pattern of the sub-array thereby to give a resultant radiation pattern as shown in FIG. 1*b*. By switching the sub-arrays progressively during each scan to steer the nulls, an optimum condition is maintained throughout the scan in which good suppression of grating lobes is maintained at all times.

By utilising a system according to the present invention array monitoring is facilitated since the matrix connections are readily accessible for this purpose and phase analysis from the phase shifters is facilitated for 'array factor' checking.

What we claim is:

1. A beam steering or scanning system for generating a scanned spacial directional beam, comprising:

a plurality of radiating elements connected in groups;

main array beam former means for providing signals for each group and for forming a main array radiation pattern characterized by an array factor including the scanned beam and associated grating lobes; and sub-array beam former means for providing a sub-array beam factor including nulls at similar spacing to the grating lobes;

wherein said array beam former means and said sub-array beam former means are controlled contemporaneously so as to modify said sub-array factor contemporaneously with said array factor;

said sub-array beam former means including a plurality of beam forming networks, one for each group of elements, and a plurality of switches, one for each network, for feeding said networks from said main array beam former means, said switches being operated sequentially so that the nulls are constrained to be substantially coincident with the grating lobes during each scan, whereby said grating lobes appearing in said main array are suppressed.

2. A beam steering or scanning system as claimed in claim 1, wherein said main array beam former means comprises at least one controllable phase shifter, and each said beam forming network comprises a controllable filter.

3. A beam steering or scanning system as claimed in claim 1, wherein each said beam forming network comprises a sub-array switchable signal distribution element in the form of a lens.

4. A beam steering or scanning system as claimed in claim 1, wherein each said beam forming network comprises a switchable signal distribution matrix.

5. A beam steering or scanning system as claimed in claim 4, wherein said signal distribution matrix comprises a Butler matrix.

6. A beam steering or scanning system as claimed in claim 4, wherein said signal distribution matrix comprises a Blass matrix.

7. A beam steering or scanning system as claimed in claim 1, wherein said beam forming network comprises a controllable filter.

8. A beam steering or scanning method for generating a scanned spacial directional beam, comprising the steps of:

(a) providing a plurality of radiating elements connected in groups;

(b) forming a main array radiation pattern characterized by an array factor including the scanned beam and associated grating lobes;

(c) contemporaneously with step (b), providing a sub-array beam factor including nulls at similar spacing to the grating lobes, so as to modify said sub-array beam factor contemporaneously with said array factor; and wherein said sub-array beam factors are provided by employing a plurality of beam forming networks, one for each group of elements, and a plurality of switches, one for each network, and by feeding said networks with said main array radiation pattern in accordance with sequential operation of said switches.

9. A beam steering or scanning method as claimed in claim 8, wherein said step (b) is carried out by controlled phase shifting.

10. A beam steering or scanning method as claimed in claim 9, wherein said step (b) results in at least one phase-shifted output, said step (c) comprising controllably and switchably providing said at least one phase-shifted output to successive radiating elements in each said group of radiating elements.

11. A beam steering or scanning method as claimed in claim 10, wherein said at least one phase-shifted output is controllably filtered as it is switchably connected to each radiating element in each said group of radiating elements.

* * * * *